United States Patent
Akiba (10) Patent No.: US 9,836,575 B2
(45) Date of Patent: Dec. 5, 2017

(54) METHOD OF DESIGN AND MANUFACTURING OF AIRCRAFT STRUCTURAL OBJECT

(71) Applicant: SUBARU CORPORATION, Tokyo (JP)

(72) Inventor: Kousaburou Akiba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 15/055,149

(22) Filed: Feb. 26, 2016

(65) Prior Publication Data

US 2016/0283648 A1  Sep. 29, 2016

(30) Foreign Application Priority Data

Mar. 25, 2015 (JP) ................. 2015-063089

(51) Int. Cl.
G06F 17/50 (2006.01)
B64F 5/00 (2017.01)

(52) U.S. Cl.
CPC ............ G06F 17/5095 (2013.01); B64F 5/00 (2013.01); G06F 17/5018 (2013.01); G06F 2217/06 (2013.01); G06F 2217/44 (2013.01)

(58) Field of Classification Search
CPC combination set(s) only.
See application file for complete search history.

(56) References Cited

U.S. PATENT DOCUMENTS 8,851,422 B2  10/2014  Dan-Jumbo

2010/0227135 A1*  9/2010  Takagi ............. B32B 17/10018
428/215
2014/0277669 A1  9/2014  Nardi et al.

FOREIGN PATENT DOCUMENTS

JP  2004-178200 A  6/2004
JP  2007-290452 A  11/2007
(Continued)

OTHER PUBLICATIONS

Jin Haibo et. al., Modified multilevel layout optimization method of composite wing structure, Proceedings of 2013 10th International Bhurban Conference on Applied Sciences & Technology (IBCAST) Islamabad, Pakistan, Jan. 15-19, 2013, pp. 6-10.*
(Continued)

*Primary Examiner* — Akash Saxena
*Assistant Examiner* — Justin C Mikowski
(74) *Attorney, Agent, or Firm* — McDermott Will & Emery LLP (57) ABSTRACT

According to one implementation, a method of making design information of an aircraft structural object, executed by a computer, includes: setting at least one parameter as a variable for an optimization calculation which minimizes a weight of the structural object composing an aircraft; setting at least one allowable range for at least a strength of the structural object corresponding to the at least one parameter; and calculating an optimal value of the weight of the structural object and a value of the at least one parameter by the optimization calculation. The at least one parameter expresses the design information of the structural object. The at least one allowable range is set as at least one constraint condition of the optimization calculation. The value of the at least one parameter corresponds to the optimal value and meets the at least one allowable range.

5 Claims, 8 Drawing Sheets

(56) References Cited

FOREIGN PATENT DOCUMENTS

| JP | 2009-259194 A | 11/2009 |
|----|---------------|---------|
| JP | 2013-073596 A | 4/2013  |
| JP | 2014-065482 A | 4/2014  |
| JP | 2014-197393 A | 10/2014 |

OTHER PUBLICATIONS

Ji-Ho Kang, Minimum-weight design of compressively loaded composite plates and stiffened panels for postbuckling strength by Genetic Algorithm, Composite Structures 69 (2005) 239-246.*

Decision to Grant issued in corresponding Japanese Patent Application No. 2015-063089, dated Jan. 4, 2017.

Notification of Reasons for Refusal issued in corresponding Japanese Patent Application No. 2015-063089, dated May 31, 2016 with English language translation (reference previously dated Jun. 30, 2016 without translation).

Office Action Japanese Patent Application No. 2015-063089 dated May 31, 2016.

Akira Todoroki et al., "Stacking Sequence Optimizations for Composite Plate Buckling by Genetic Algorithm with Response Surface in Lamination Parameters", Transactions of the JSME. A, Japan, The Japan Society of Mechanical Engineers, May 25, 1998, vol. 64/No. 621, pp. 1138-1145 w/English language Abstract.

* cited by examiner

METHOD OF DESIGN AND MANUFACTURING OF AIRCRAFT STRUCTURAL OBJECT

CROSS REFERENCES TO RELATED APPLICATIONS

This application is based upon and claims the benefit of priority from Japanese Patent Application No. 2015-63089, filed on Mar. 25, 2015; the entire contents of which are incorporated herein by reference.

FIELD

Implementations described herein relate generally to an aircraft structural object, a method of manufacturing an aircraft structural object, a method of making design information of an aircraft structural object, a designing system of an aircraft structural object and a recording medium with a design program of an aircraft structural object recorded.

BACKGROUND

It is important that an aircraft is designed so that its weight becomes as small as possible. However, an aircraft is very complicated and has many parts. Therefore, optimization of weight has been attempted when an outline specification is designed depending on performance required for the whole aircraft (for example, refer to Japanese Patent Application Publication JP 2013-073596 A).

When an outline specification of the whole airframe is determined so that its weight becomes as small as possible, a structural pattern and a structure diagram for every structural object, such as main wings and a fuselage, are determined according to the outline specification. For example, in the case of a main wing, a structural pattern, such as the number and arrangement of spars and ribs, is determined according to an outline specification of the whole airframe.

When a structural pattern of a structural object is determined, sizing (size determination) of sheet thicknesses, cross-sectional areas and the like of parts composing the structural object is performed. Specifically, a structural object is evaluated for each of various evaluation items, such as whether the structural object has necessary intensity and flutter speed, and sizing of each part is performed so that constraints are satisfied for all of the evaluation items.

An object of the present invention is to allow further reducing a weight of an aircraft.

SUMMARY OF THE INVENTION

In general, according to one implementation, a method of making design information of an aircraft structural object, executed by a computer, includes: setting at least one parameter as a variable for an optimization calculation which minimizes a weight of the structural object composing an aircraft; setting at least one allowable range for at least a strength of the structural object corresponding to the at least one parameter; and calculating an optimal value of the weight of the structural object and a value of the at least one parameter by the optimization calculation. The at least one parameter expresses the design information of the structural object. The at least one allowable range is set as a constraint condition of the optimization calculation. The value of the at least one parameter corresponds to the optimal value and meets the at least one allowable range.

Further, according to one implementation, a method of manufacturing an aircraft structural object according to the design information of the aircraft structural object made by the above-mentioned method is provided.

Further, according to one implementation, an aircraft structural object manufactured according to the design information of the aircraft structural object is provided. The design information is made by the above-mentioned method.

Further, according to one implementation, a designing system of an aircraft structural object includes processing circuitry. The processing circuitry sets at least one parameter as a variable for an optimization calculation which minimizes a weight of the structural object composing an aircraft, sets an allowable range for at least a strength of the structural object corresponding to the at least one parameter, and calculates an optimal value of the weight of the structural object and a value of the at least one parameter by the optimization calculation. The at least one parameter expresses design information of the structural object. The allowable range is set as a constraint condition of the optimization calculation. The value of the at least one parameter corresponds to the optimal value and meets the allowable range.

Further, according to one implementation, a recording medium with a design program of an aircraft structural object recorded makes a computer execute: setting at least one parameter as a variable for an optimization calculation which minimizes a weight of the structural object composing an aircraft; setting an allowable range for at least a strength of the structural object corresponding to the at least one parameter; and calculating an optimal value of the weight of the structural object and a value of the at least one parameter by the optimization calculation. The at least one parameter expresses design information of the structural object. The allowable range is set as a constraint condition of the optimization calculation. The value of the at least one parameter corresponds to the optimal value and meets the allowable range.

DETAILED DESCRIPTION

An aircraft structural object, a method of manufacturing an aircraft structural object, a method of making design information of an aircraft structural object, a designing system of an aircraft structural object and a recording medium with a design program of an aircraft structural object recorded according to implementations of the present invention will be described with reference to the accompanying drawings.

(Configuration and Function)

Figure 1:
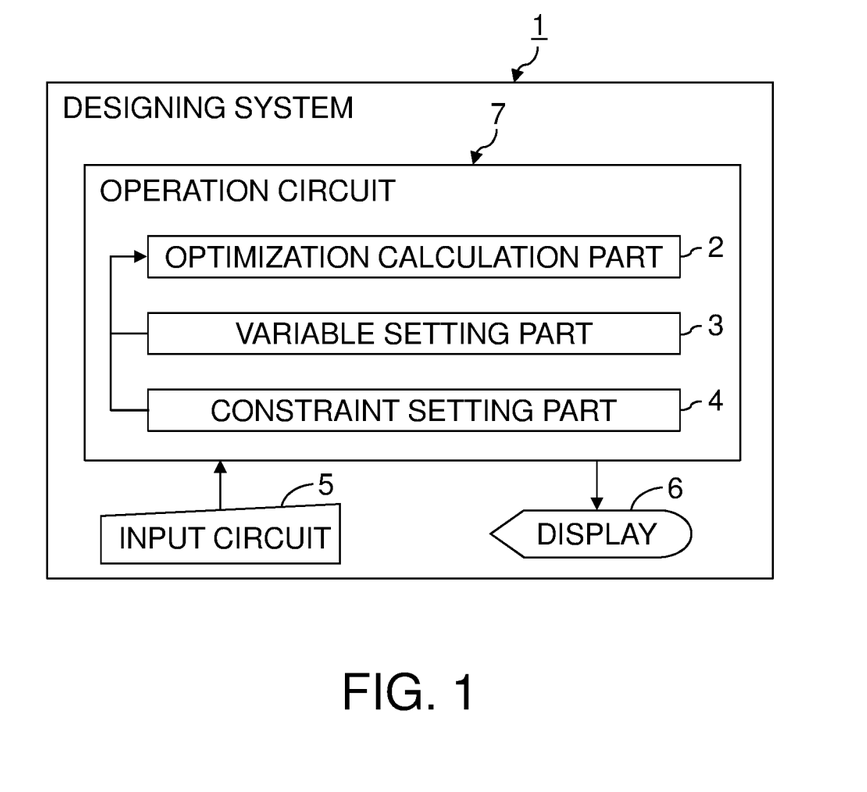
FIG. 1 is a block diagram of a designing system of an aircraft structural object according to an implementation of the present invention.

FIG. 1 is a block diagram of a designing system of an aircraft structural object according to an implementation of the present invention.

A designing system 1 of an aircraft structural object makes appropriate design information of the structural object by performing an optimization calculation which minimizes weight of the structural object composing an aircraft, instead of the whole aircraft. Examples of a structural object include the whole or a part of a wing structural object, such as a main wing, a center wing or a tail plane, and a fuselage. Therefore, when a structural object is a wing structural object, an aircraft structural object whose elements are spars, ribs, panels (also called skins), stringers and the like is a target for design and an optimization calculation.

For that purpose, the designing system 1 of an aircraft structural object has an optimization calculation part 2, a variable setting part 3, and a constraint setting part 4. The designing system 1 can be configured by installing a design program of an aircraft structural object on an operation circuit 7 of a computer having an input circuit 5, a display 6, and the operation circuit 7. In other words, the design program of an aircraft structural object makes the computer function as the optimization calculation part 2, the variable setting part 3, and the constraint setting part 4. The design program of an aircraft structural object can also be recorded on an information recording medium, and distributed as a program product.

Note that, circuits may be used to configure the optimization calculation part 2, the variable setting part 3, and the constraint setting part 4. Any computer is also configured by electronic circuitry. Therefore, when a computer is assumed to be a kind of circuitry, it can also be said that the optimization calculation part 2, the variable setting part 3, and the constraint setting part 4 can be configured by processing circuitry.

The optimization calculation part 2 has a function to calculate an optimal value of weight of a structural object composing an aircraft and parameters expressing design information (hereinafter called "design parameters") of the structural object, corresponding to the optimal value of weight, by performing an optimization calculation which minimizes the weight of the structural object using the design parameters as variables. The combination of design parameters corresponding to the optimal value of weight of a structural object is a parameter group expressing the optimal design information of the structural object. Therefore, the combination of the design parameters, corresponding to the optimal value of weight, calculated in the optimization calculation part 2 can be provided to a design client or the like as appropriate design information of the structural object.

The variable setting part 3 has a function to set design parameters as variables for the optimization calculation in the optimization calculation part 2. Setting of the design parameters can be performed by operating the input circuit 5 through a user interface displayed on the display 6.

For example, when a structural object is a wing structural object, a structural object having at least structure in which ribs and spars are attached on a panel is a target of an optimization calculation. Therefore, parameters, such as a sheet thickness of a panel, each cross-sectional area of ribs and spar chords, and each sheet thickness of ribs and spar webs, for determining sizes of parts composing the structural object can be set as design parameters of the optimization calculation. Note that, a spar chord is a flange portion of a spar coupled to a panel, and a spar web is a platy portion surrounded by flanges of a spar.

More specifically, in the case where a design parameter is a thickness of a panel, a range which a value of the design parameter can have can be set to a range from 50% to 130% of an initial value of the design parameter. Meanwhile, the number of values of the design parameter can be determined as a practical number approximately from 20 to 30, from a viewpoint of making an amount of data processing for the optimization calculation be a practical amount. The similar applies to other design parameters for determining sizes of parts composing a structural object.

Examples of design parameters other than the design parameters for determining sizes of parts include information, such as a kind of metal or a kind of composite material, for specifying a material of each structural member composing a structural object. When a material of a structural member is a metal, such as aluminum alloy or magnesium alloy, it is often enough to set parameters, for determining a material and a size of the structural member, as design parameters.

Meanwhile, when a material of a structural member is a composite material, such as GFRP (glass fiber reinforced plastics) or CFRP (carbon fiber reinforced plastics), it is preferable to set parameters for specifying a lamination structure of the composite material as design parameters, in addition to parameters for determining a size of the structural member made of the composite material, from a viewpoint of further minimizing weight of a structural object.

Figure 2:
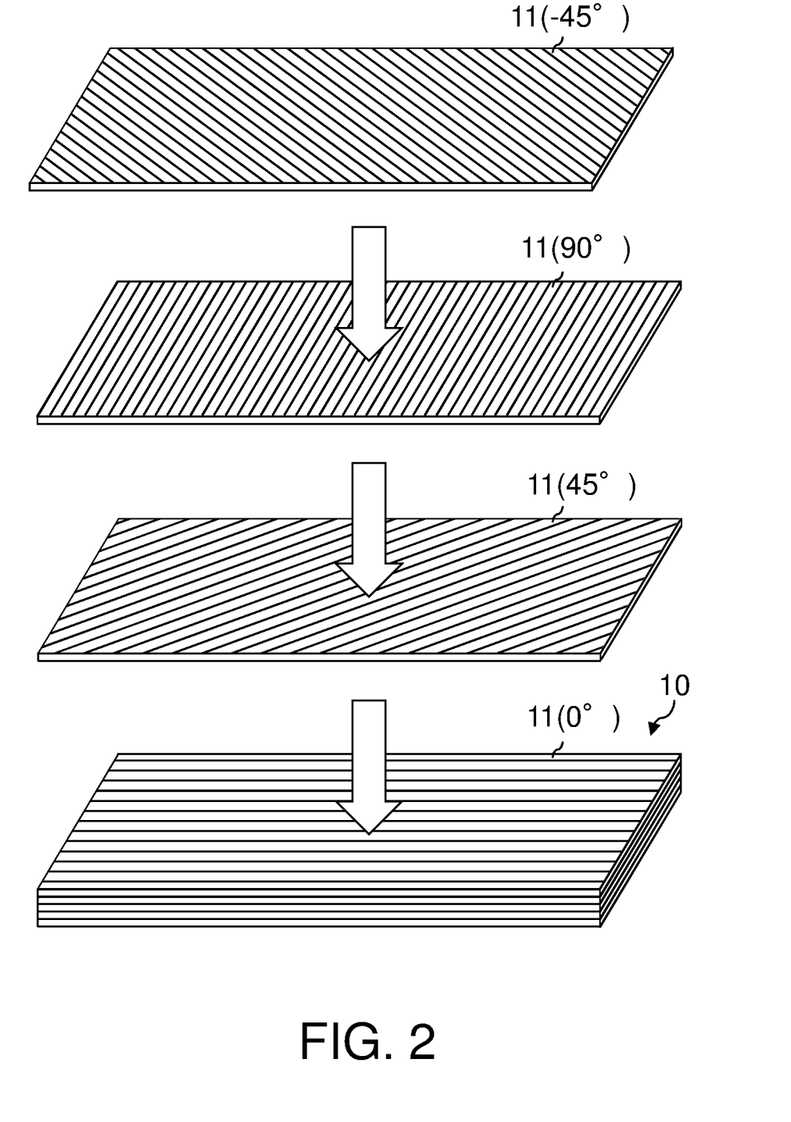
FIG. 2 shows an example of lamination structure of a composite material.

FIG. 2 shows an example of lamination structure of a composite material.

As shown in FIG. 2, a composite material 10 is made by laminating sheet-like fiber reinforced layers (plies) 11. Therefore, the lamination structure of the composite material 10 is specified by fiber orientation angles of the fiber reinforced layers 11 and a lamination order of the fiber reinforced layers 11.

For example, the composite material 10 made by laminating the fiber reinforced layers 11 so that all of the fiber orientation angles become the same direction is called one-direction material. Furthermore, a method of laminating the fiber reinforced layers 11 with combining orientation angles in the positive direction with orientation angles in the negative direction is called angle-ply lamination. In addition, the composite material 10, which is called symmetric laminate, is also known as the composite material 10 having the fiber reinforced layers 11 laminated so that fiber orientation angles become symmetric in the thickness direction of the composite material 10.

Thus, fiber orientation angles of the fiber reinforced layers 11 and a lamination order of the fiber reinforced layers 11 can be defined as design parameters. In addition, lamination parameters have also been defined as parameters to specify a lamination structure of the composite material 10. Therefore, the lamination parameters of the composite material 10 may also be used as design parameters.

Note that, fiber orientation angles of the fiber reinforced layers 11 are generally selected from discontinuous and very limited specific values like 0°, 45°, 90°, and −45°. Thus, to prepare some typical lamination structures of the composite material 10 and to use information for identifying a pattern of lamination structure of the composite material 10 as a design parameter lead to reducing an amount of data processing for the optimization calculation. Specifically, while there are a very large number of possible combinations consisting of fiber orientation angles of the fiber reinforced layers 11 and a lamination order of the fiber reinforced layers 11 as design parameters, an amount of data processing for the optimization calculation can be reduced by using a pattern itself of lamination structure as a design parameter.

According to analyses performed with changing a fiber orientation angle of the fiber reinforced layers 11, it was confirmed that a flutter speed increased depending on a ratio of the fiber reinforced layers 11 whose orientation angle is ±45°. A flutter is a rapid self-excited vibration caused by wings and a fuselage of an aircraft flying at not less than a certain speed, due to an interaction between aerodynamic force and elastic force of a structural object. Meanwhile, a flutter speed is a speed at which a flutter starts to occur.

Therefore, in the case of using the composite material 10 as a material of an aircraft structural object, a rate of the fiber reinforced layers 11 whose orientation angle is ±45° is a factor influencing mechanical characteristics of the structural object. Thus, it is preferable to prepare, as choices, patterns of lamination structure of the composite material 10 having different rates of the fiber reinforced layers 11 whose orientation angle is ±45°, from a viewpoint of further minimizing a weight of the structural object. As a more specific example, four patterns of lamination structure can be prepared by setting a rate of the fiber reinforced layers 11 whose orientation angle is ±45° to be 40%, 50%, 60%, and 70%, and information for identifying a pattern of lamination structure can be used as a design parameter expressing a lamination structure of the composite material 10.

Furthermore, an inclined angle of the composite material 10 itself, which is specified by fiber orientation angles of the fiber reinforced layers 11 and a lamination order of the fiber reinforced layers 11, to a structural object also influences mechanical characteristics of the structural object. Thus, it is desirable to also set the inclined angle of the composite material 10 itself to the structural object, that is, rates of fiber orientation angles in a coordinate system fixed to the structural object, as a design parameter which can be variably set and expresses a lamination structure of the composite material 10.

The fiber reinforced layers 11 are laminated with possibly changing the fiber orientation angle with a pitch of 45°. Therefore, in the case of setting the inclined angle of the composite material 10 itself as a design parameter, it is appropriate to enable to change the inclined angle of the composite material 10 with a pitch smaller than a pitch for changing the fiber orientation angle. As a specific example, when the inclined angle of the composite material 10 can be changed with the 15° pitch, the five inclined angles of −30°, −15°, 0°, +15°, and +30° can be set as selectable values of a design parameter.

In the variable setting part 3, a structural pattern itself of structural object can be defined as a design parameter, in addition to the design parameters for sizing of respective parts, such as sizes of respective parts, the design parameters for specifying materials of structural members, and the design parameters for specifying lamination structures of the composite materials 10, as described above. That is, structural patterns of structural object which may be adopted can be set as selectable values of a design parameter.

A structural pattern of a structural object can be specified by setting, as a parameter, at least one of the number of spars composing the structural object, the number of ribs composing the structural object, angles of the spars, angles of the ribs, whether stringers are attached to a panel composing the structural object, and whether the panel has structure in which a honeycomb is sandwiched between two sub panels. Therefore, a desired parameter or desired parameters out of these parameters for specifying a structural pattern can be set as a design parameter or design parameters to be varied in an optimization calculation of a weight of a structural object.

In an optimization calculation of a weight of a structural object, analytical processing by the FEM (finite element method) is performed in order to estimate whether the structural object specified by design parameters has required strengths and flutter speed. The FEM is an analytical method for obtaining an approximate solution of a differential equation which is difficult to be solved analytically, by dividing a domain, where the equation has been defined, into elements.

That is, strengths and flutter speeds of a structural object specified by design parameters are estimated by the FEM analysis. Specifically, a structural object is divided into elements, and stresses and a flutter speed for every element are calculated. Then, processing for estimating whether the calculated stresses and flutter speed for every element are within acceptable ranges respectively is performed as a part of the optimization calculation. Therefore, an analytical model which simulates a structural pattern of the structural object is to be prepared for the FEM analysis.

When parameters for specifying a structural pattern, such as the number of ribs, are used as parameters of an FEM analytic model, nodes and elements themselves of the FEM analytic model are to be its parameters. In this case, the number of the parameters becomes huge, thereby the FEM analytic processing becomes very complicated. Therefore, calculation time required for the whole optimization calculation becomes very long.

Accordingly, a model for the FEM analysis performed in order to calculate strengths or the like of a structural object can be made for every structural pattern which may be adopted as a structural pattern of the structural object. Then, information for identifying one of models corresponding to structural patterns can be set as a design parameter.

Figure 3A:
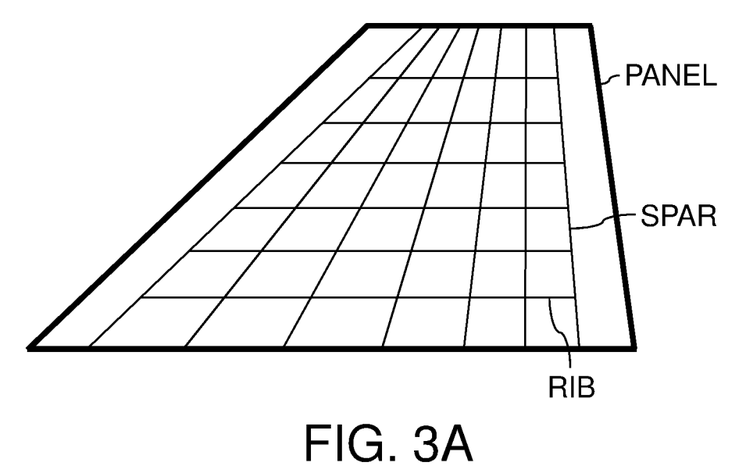
FIGS. 3A and 3B show an example of making FEM models by changing the number of spars of a structural object having structure in which at least ribs and the spars have been disposed on a panel.
Figure 3B:
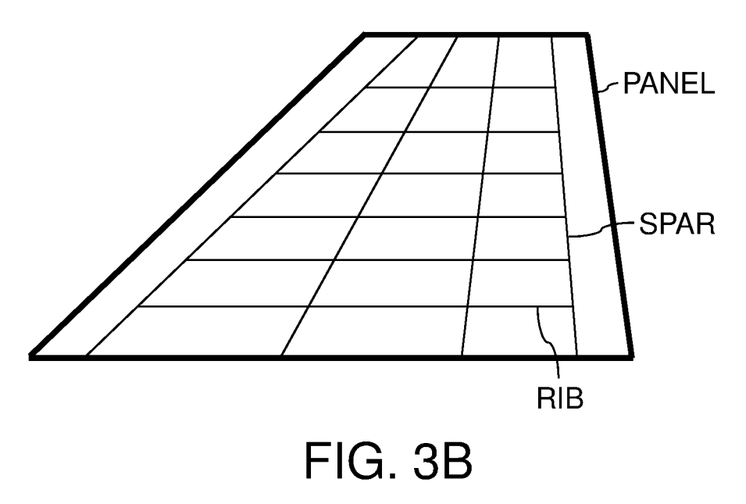

FIGS. 3A and 3B show an example of making FEM models changing the number of spars of a structural object having structure in which at least ribs and the spars have been disposed on a panel.

As shown in FIGS. 3A and 3B, FEM models can be made by changing the number of the spars composing a structural object. Specifically, the number of the spars in the FEM model shown in FIG. 3B is smaller than the number of the spars in the FEM model shown in FIG. 3A. Similarly, FEM models can also be made by changing the number of the ribs.

Figure 4:
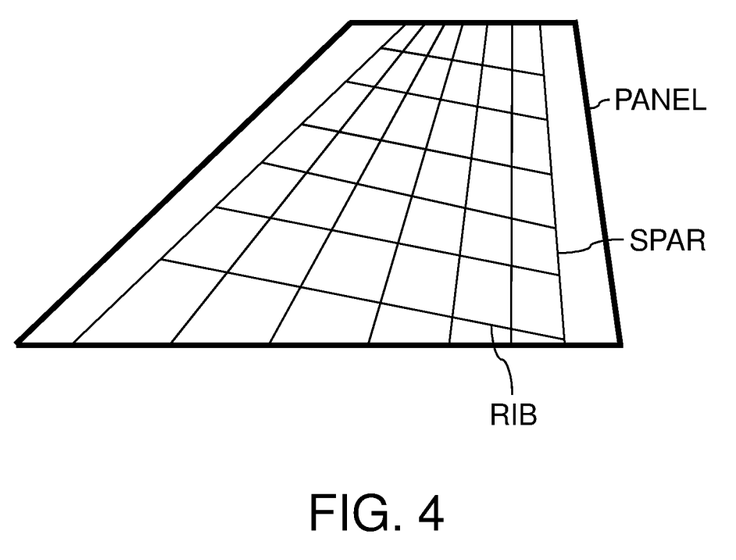
FIG. 4 shows an example of making a new FEM model by changing the angle of ribs of a structural object having structure in which at least the ribs and spars have been disposed on a panel.

FIG. 4 shows an example of making a new FEM model by changing the angle of ribs of a structural object having structure in which at least the ribs and spars have been disposed on a panel.

As shown in FIG. 4, FEM models can also be made by changing the length direction of the ribs. Similarly, FEM models can also be made by changing the angle of the spars.

FIGS. 5A, 5B, 5C, and 5D show an example of making FEM models by changing a part or parts other than ribs and spars of a structural object having structure in which at least the ribs and the spars have been disposed on a panel.

Figure 5A:
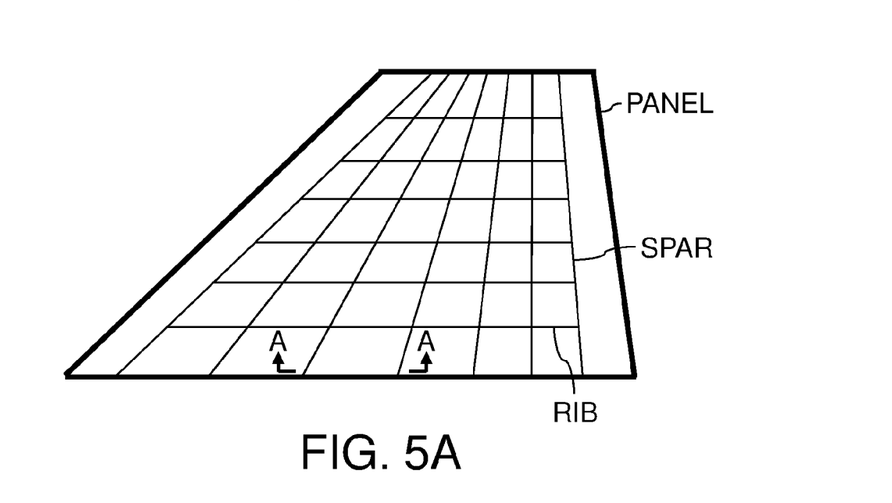
FIGS. 5A, 5B, 5C, and 5D show an example of making FEM models by changing a part or parts other than ribs and spars of a structural object having structure in which at least the ribs and the spars have been disposed on a panel.
Figure 5B:
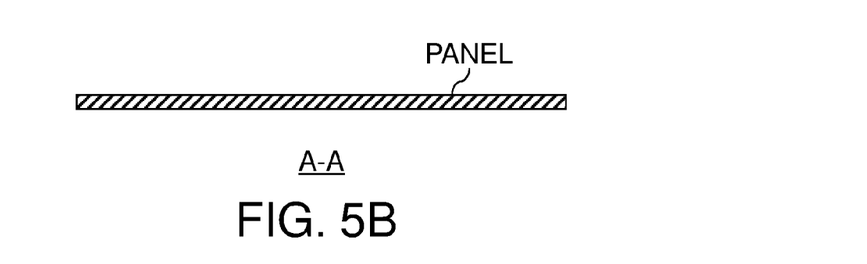
Figure 5C:
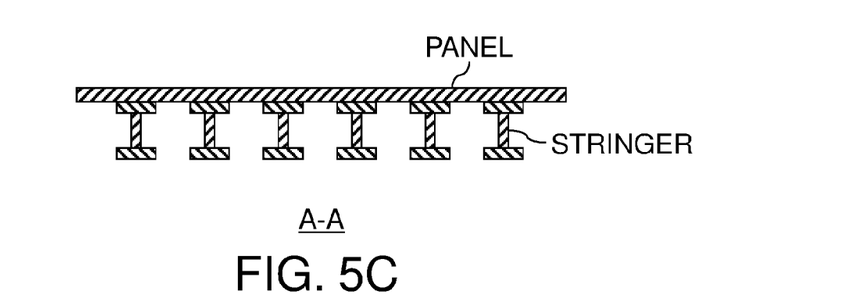
Figure 5D:
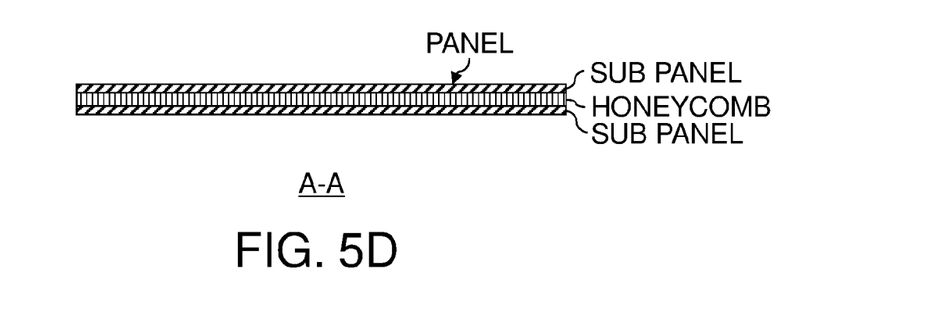

FEM models can also be made by changing apart or parts other than the ribs and the spars of a structural object having structure in which the ribs and the spars have been disposed on the panel as shown in FIG. 5A. FIGS. 5B, 5C, and 5D are sectional views of the panel at the position A-A of FIG. 5A, respectively.

FIG. 5B shows an FEM model of a simple structural object composed by disposing the ribs and the spars on the panel. FIG. 5C shows an FEM model of a structural object reinforced by attaching stringers to the panel. FIG. 5D shows an FEM model of a structural object of which the panel has a honeycomb sandwich structure that a honeycomb is sandwiched by two sub panels.

As exemplified in FIGS. 3A and 3B, FIG. 4, and FIGS. 5A, 5B, 5C, and 5D, FEM models can be made by changing arrangement of structural members, such as spars and ribs, and/or structure of a panel. Specifically, plural models can be made by changing at least one of the number of spars composing a structural object, the number of ribs composing the structural object, angles of the spars, angles of the ribs, whether stringers are attached to a panel composing the structural object, and whether the panel has structure of sandwiching a honeycomb between two sub panels.

Then, information specifying an FEM model can be used as a design parameter. Thereby, structural patterns of a structural object can be simply parameterized without using nodes and elements of an FEM model as parameters. Since practical structural patterns which can be choices are limited, it can be considered that it is enough to prepare about ten FEM models. Therefore, a throughput of the optimization calculation which optimizes a weight of a structural object can be reduced without lowering accuracy of the calculation.

As described above, at least one of the number of spars composing a structural object, the number of ribs composing the structural object, angles of the spars, angles of the ribs, whether stringers are attached to a panel composing the structural object, and whether the panel has structure of sandwiching a honeycomb between two sub panels can be indirectly set as a design parameter, by parameterizing an FEM model itself.

Note that, making plural FEM models corresponds to enabling to select a value of at least one parameter, such as the number of spars, defining a structural pattern, from plural values. Therefore, at least one parameter, such as the number of spars, which defines a structural pattern may be set as a design parameter which is changed intermittently in an optimization calculation. Then, when a parameter or parameters which define a certain structural pattern have been net to a certain value or certain values, a corresponding FEM model may be retrieved.

As described above, when plural FEM models are set as values of a design parameter, sizes and materials of structural members, such as a panel, spars, ribs, stringers, and a honeycomb structure, which compose one selected FEM model also become values of design parameters. Furthermore, when a material of a certain structural member is a composite material, a lamination structure of the composite material can also be expressed by a design parameter or design parameters as described above. As a matter of course, when a structural pattern has been fixed, only sizes, materials and the like of structural members may also be set as design parameters using a single FEM model.

The constraint setting part 4 has a function to set allowable ranges for strengths and the like of a structural object corresponding to design parameters, as constraint conditions of the optimization calculation in the optimization calculation part 2. The design parameters are respectively changed, in the optimization calculation, within allowable ranges which have been set directly or indirectly as the constraint conditions in the constraint setting part 4. Therefore, values of design parameters corresponding to the optimal value of a weight of a structural object, calculated as a result of the optimization calculation in the optimization calculation part 2, meet allowable ranges for strengths, a flutter speed and the like.

Setting constraint conditions can also be performed by operating the input circuit 5 through a user interface displayed on the display 6.

It is desirable to set allowable ranges for strengths or the like, which are set as constraint conditions, for each evaluation item required for a structural object. This is because if allowable ranges are not set for all items which require evaluations, design parameters need to be recalculated so long as an unvalued item is out of an allowable range, even when values of the design parameters corresponding to the optimal value of a weight of a structural object have been calculated by performing the optimization calculation. Furthermore, the design parameters, which have been recalculated so that an unvalued item becomes within an allowable range, do not correspond to the optimal value of the weight of the structural object.

That is, unless allowable ranges are set as constraint conditions for all items whose evaluations are essential, the optimization calculation for minimizing a weight of a structural object cannot be performed in the true sense. Therefore, when a method of setting allowable ranges and an evaluation method are not established for a certain evaluation item, the optimization calculation of a weight of a structural object cannot be performed. This is one of reasons why it has been conventionally difficult to perform an optimization calculation of a weight of a structural object although setting methods of allowable ranges and evaluation methods have been proposed individually for some evaluation items.

Allowable ranges which should be set as constraint conditions include an allowable range for a flutter speed of a structural object besides allowable ranges with regard to strengths. A strength of a structural object is estimated for a plurality of evaluation items. Specifically, it is estimated whether evaluation parameters with regard to strengths of a structural object, such as a compressive buckling load, a shear buckling load, a load which causes a crippling fracture (local buckling), an Euler buckling load (column buckling load), and strengths of a material, become not less than values obtained by giving necessary strength margins to loads applied on the structural object, respectively. In other words, it is estimated whether a stress distribution, caused by a pressure of air, inside a structural object specified depending on design parameters becomes smaller, with a necessary margin, than each of evaluation parameters for strengths, such as a compressive buckling load, a shear buckling load, a local buckling load which causes a crippling fracture, an Euler buckling load, and strengths of a material.

Note that, a buckling load is a load which causes buckling. Allowable ranges for strengths of a material are determined as values obtained by giving strength margins to yield stresses or ultimate stresses of compression, tension, shear, surface pressure and the like of the material. Each of the strength margins to loads is generally given by multiplying the maximum load (limit load), which is applied at the time of operation of an aircraft, by a safety factor and a necessary coefficient. A value obtained by multiplying a limit load by the safety factor 1.5 is called the ultimate load, and used as the maximum load which guarantees not to break.

Similarly, a structural object can also be estimated with regard to flutter speeds. Specifically, it is estimated whether a possible movement speed of a structural object becomes not more than a speed to which a margin is added by multiplying a flutter speed by a safety factor and the like.

Design, which prevents buckling from occurring at not more than the ultimate load, by evaluating strengths of a structural object is called non-buckling design. Nevertheless, when a material of a structural object is a composite material, the non-buckling design cannot fully take advantages of fiber reinforcing of the composite material. Thus, when a structural object is a composite material, it is desirable to perform post-buckling design which accepts buckling at not more than the ultimate load, from a viewpoint of attaining a further weight reduction of a structural object.

In the case of performing the post-buckling design of a composite material, it is necessary to estimate strengths of the composite material after buckling by performing a post-buckling analysis. Specifically, it is necessary to estimate whether strengths of a composite material after buckling have sufficient strength margins to loads applied on a structural object.

The post-buckling analysis is a nonlinear FEM analysis, of which input information is a stress distribution inside a structural object made of a composite material, for obtaining sheet thicknesses and sizes of the structural object, necessary for securing strengths required after buckling. The stress distribution inside the structural object made of a composite material, which is an input of the post-buckling analysis, can also be obtained as a result of an FEM analysis as described above.

Therefore, when an internal stress distribution of a structural object specified by design parameters is obtained by an FEM analysis of the structural object, and a post-buckling analysis is performed with the internal stress distribution of the structural object as an input, necessary sheet thicknesses and sizes of the structural object can be obtained. Then, when the sheet thicknesses of the structural object, specified by the design parameters, are larger than the necessary sheet thicknesses of the structural object, obtained as a result of the post-buckling analysis, conditions of a post-buckling design are to be satisfied.

Thus, allowable ranges of sheet thicknesses corresponding to necessary strengths after buckling, obtained as a result of a post-buckling analysis of a composite material, can be set as constraint conditions of the optimization calculation. That is, constraint conditions for securing the strengths of the composite material after the buckling can be set as the constraint conditions of the optimization calculation.

The post-buckling analysis of a composite material is a complicated nonlinear FEM analysis unlike a simple buckling analysis. Therefore, the post-buckling analysis of a composite material has been conventionally performed using dedicated FEM structural analysis software. Furthermore, the post-buckling analysis of a composite material requires a great deal of calculation time.

Thus, the post-buckling analysis can be previously performed using dedicated FEM structural analysis software, and a database of results of the post-buckling analysis of a composite material can be made. Specifically, a sizing table showing a relationship between loads applied on a structural object made of a composite material and necessary sheet thicknesses can be made.

Figure 6:
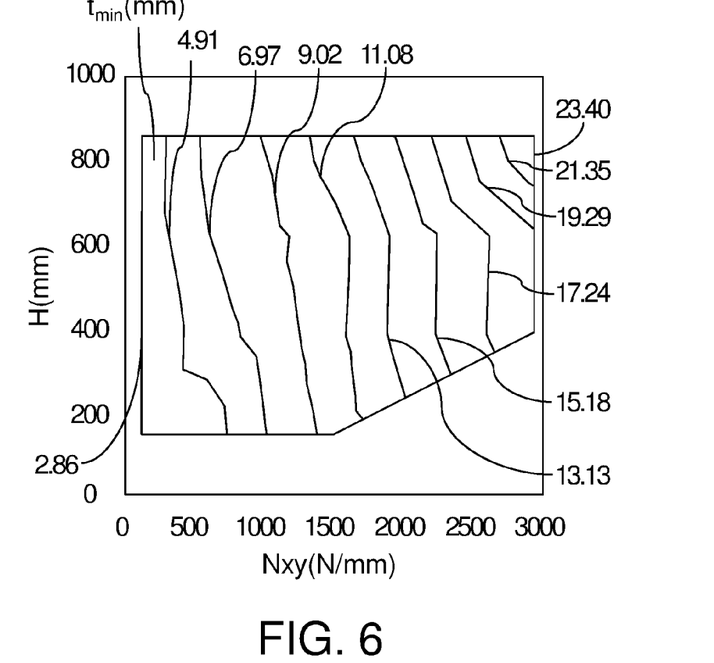
FIG. 6 shows an example of evaluation table showing the lower limit of a sheet thickness of a spar web.
Figure 7:
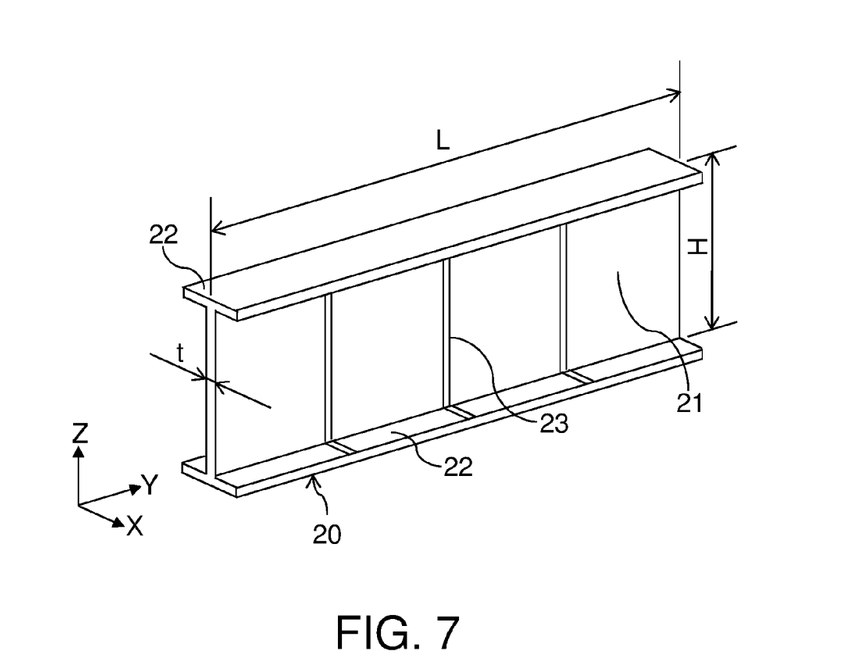
FIG. 7 shows an example of analytical model for a post-buckling analysis used in order to obtain the evaluation table shown in FIG. 6.

FIG. 6 shows an example of evaluation table showing the lower limit of a sheet thickness of a spar web. FIG. 7 shows an example of analytical model for a post-buckling analysis used in order to obtain the evaluation table shown in FIG. 6.

As shown in FIG. 7, a spar 20 which is one of structural parts made of composite materials has a platy spar web 21, and upper and lower chords 22. Therefore, the spar 20 has structure whose cross-sectional shape is an I shape. In addition, some stiffeners 23 are attached to the spar web 21 at a predetermined interval. Therefore, a shape of the spar 20 can be specified using the length L, the height H, and the sheet thickness t as parameters. Furthermore, a spatial coordinate system in which Z-axis represents the height direction of the spar 20, Y-axis represents the length direction of the spar 20, and X-axis represents the sheet thickness direction of the spar web 21 can be defined for an FEM analysis.

In FIG. 6, the horizontal axis shows internal loads Nxy (N/mm) of the spar web 21 on the XY plane while the vertical axis shows heights H (mm) of the spar web 21. Each region surrounded by curves shows the sheet thickness $t_{min}$ of the spar web 21 necessary for securing material strengths, such as the maximum principal strain and the maximum principal shear strain, required after buckling.

As shown in FIG. 6, the sheet thicknesses $t_{min}$ of the spar webs 21, having different heights H, needed when the internal loads Nxy act on the spar webs 21 can be previously obtained as a two-dimensional map by a post-buckling analysis. Specifically, a sizing table showing a relationship between the internal loads Nxy and the necessary sheet thicknesses $t_{min}$ can be made. The post-buckling analysis can be performed by a nonlinear FEM analysis in which 150% of a limit load is applied, for example.

Thereby, an evaluation of a structural object after buckling can be performed without repeatedly performing a post-buckling analysis in an optimization calculation of a weight of the structural object. That is, it can be determined whether a structural object after buckling has necessary strengths. Although an evaluation table with regard to the sheet thickness t of the spar web 21 has been exemplified in FIG. 6, a similar evaluation table with regard to a sheet thickness can also be made for another structural part, such as a rib web.

Thus, it becomes possible to evaluate strengths of a composite material after buckling, in a practical period, as a part of an optimization calculation. That is, it becomes possible to evaluate strengths of a composite material after buckling in a repetitive calculation. In other words, it becomes possible to set allowable ranges of design parameters, previously obtained by performing a post-buckling analysis of a composite material, as constraint conditions of an optimization calculation.

As a matter of course, if a processing time of a post-buckling analysis is shortened by development of operation ability of a computer, a nonlinear post-buckling analysis may be performed as a part of an optimization calculation.

(Operation and Action)

Next, a method of making design information of an aircraft structural object using the designing system 1 for aircraft structural object will be explained.

Figure 8:
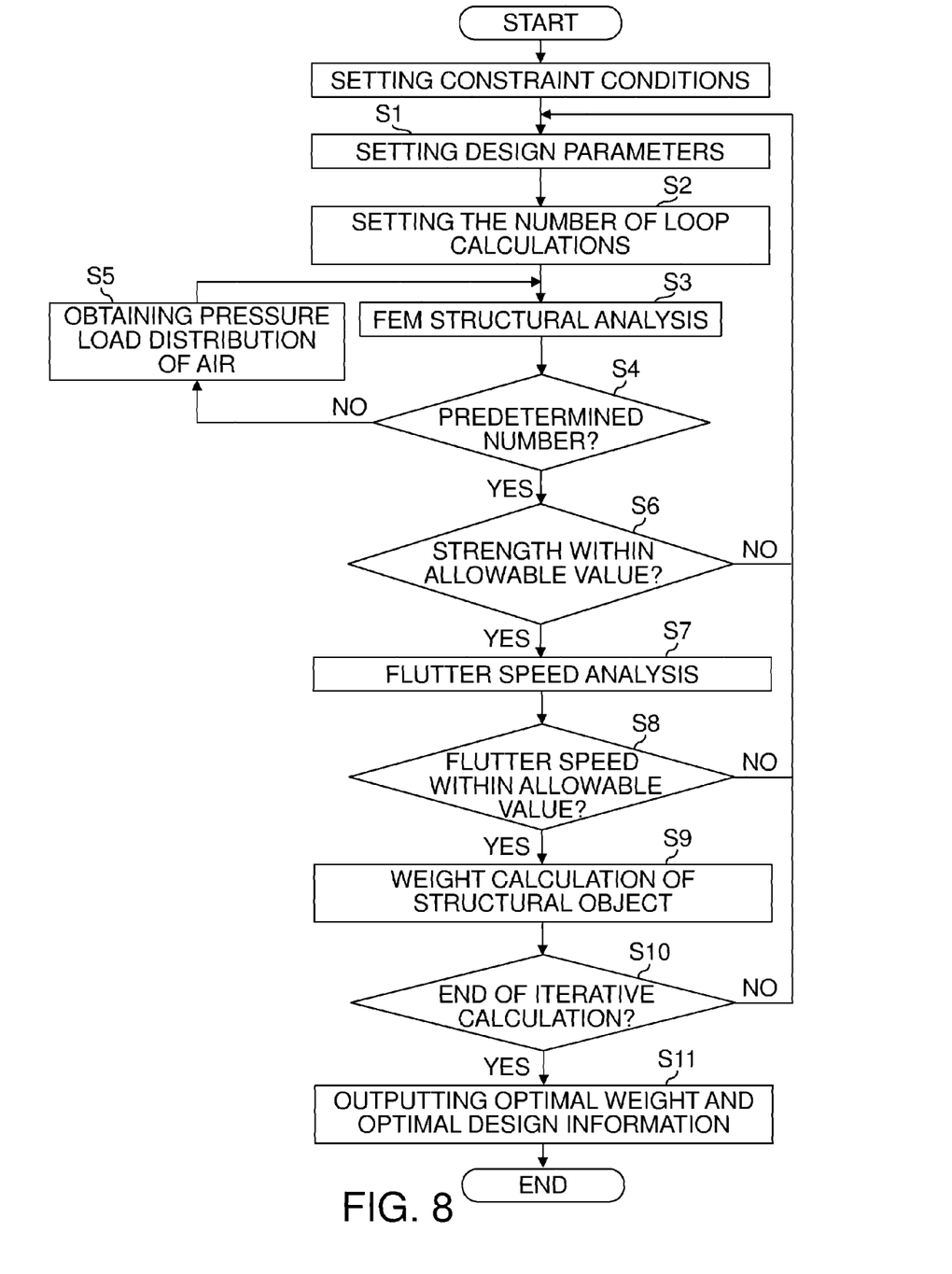
FIG. 8 is a flow chart showing a processing flow for making design information of an aircraft structural object by the designing system shown in FIG. 1.

FIG. 8 is a flow chart showing a processing flow for making design information of an aircraft structural object by the designing system 1 shown in FIG. 1.

Firstly, allowable ranges for strengths of a structural object corresponding to design parameters expressing design information of the structural object are set in the constraint setting part 4 beforehand, as constraints of an optimization calculation for minimizing weight of the structural object in the optimization calculation part 2. Specifically, allowable ranges with regard to strengths of the structural object and an allowable range with regard to a flutter speed are set as constraints in the constraint setting part 4. As the allowable ranges about strengths of the structural object, allowable ranges based on strengths after buckling of a composite material can be set besides allowable ranges about buckling and the like, as mentioned above.

When the constraints are set, an optimization calculation for computing the optimal value of weight of the structural object and design parameters which corresponds to the optimal value and meets the allowable ranges can be performed in the following procedures.

In the beginning, in Step S1, design parameters are set, in the variable setting part 3, as variables to perform the optimization calculation. As a specific example, sizes of structural members, such as a sheet thickness of a panel, cross-sectional areas of ribs and spar chords, sheet thicknesses of ribs and spar webs, can be set as design parameters. Moreover, at least one parameter for specifying a lamination structure of a composite material as shown in FIG. 2 can be set as a design parameter.

In addition, at least one FEM model for FEM analyses which are performed in order to evaluate strengths and flutter speeds of the structural object is prepared. The FEM model can be created based on an aerodynamic diagram corresponding to the structural object, such as a wing and a fuselage. The FEM model is created according to a structural pattern of the structural object. Therefore, when the structural pattern of the structural object has been settled, one FEM model is created.

Alternatively, further minimization of weight of the structural object can be attained by parameterizing a structural pattern itself of the structural object, such as the numbers and arrangement of spars and ribs. In that case, to create plural FEM models, simulating possibly chosen structural patterns of the structural object, as values of a design parameter leads to facilitation of processing in the optimization calculation. Accordingly, the following case is explained here, that is, plural FEM models corresponding to structural patterns of the structural object which are exemplified in FIG. 3, FIG. 4, and FIG. 5 are created and the FEM models themselves are set as values of a design parameter.

A value of each design parameter is to be changed in the optimization calculation. With regard to each of continuously changeable design parameters, such as a certain size of a structural member, variation conditions, such as an initial value, a range within which the value can be varied, a variation of the value and the number of values which can be chosen, are set for each design parameter. Meanwhile, with regard to each of design parameters which cannot be varied continuously, such as a lamination structure of a composite material and discernment information for an FEM model, variation conditions, such as an initial value and an order of possibly chosen values are set for each design parameter.

Then, when all the design parameters have been defined, a value of each design parameter is set to the initial value. That is, the initial FEM model is selected from the FEM models. Then, sizes and composite material lamination structures of structural members which compose the selected FEM model are set to the initial values respectively.

Thereby, the structure of the structural object is settled. This makes it possible to perform evaluation of strengths and flutter speeds of the structural object corresponding to the design parameters. An order of the evaluation of strengths of the structural object and the evaluation of flutter speeds of the structural object is arbitrary. Nevertheless, analysis processing for obtaining flutter speeds is generally a more complicated calculation compared with analysis processing for obtaining strengths. Therefore, the time required for the analysis processing for obtaining flutter speeds is longer than the time required for the analysis processing for obtaining strengths.

Accordingly, performing the evaluation of strengths prior to the evaluation of flutter speeds makes it possible to shorten processing time of the optimization calculation as a whole. Thus, explanation will be made here in an example case where flutter speeds of the structural object is evaluated after strengths is evaluated.

In order to evaluate strengths of the structural object, it is necessary to obtain stresses of respective elements, under a distribution of air pressure, by an FEM analysis. In order to obtain stresses of the elements caused by air pressure in a high accuracy, it is desirable to consider deformation of the structural object, such as a wing, due to the static aeroelastic effect.

The static aeroelastic effect is the effect that the structural object is deformed as an elastic body by an aerodynamic force. Note that, an aerodynamic force is expressed by six component forces including a drag which is an air resistance in a direction of movement, a lift in an up-and-down direction, a lateral force by a crosswind, a pitch moment (pitching moment), a rolling moment (roll moment), and a yaw moment (yawing moment).

In order to correctly obtain deformation amounts of the structural object due to the static aeroelastic effect, it is necessary to calculate a distribution of air pressure load on the structural object by a CFD (Computational Fluid Dynamics) analysis based on an aerodynamic diagram corresponding to an airframe form. The CFD analysis is a numerical analysis for analyzing a flow field by solving equations, such as the Euler equation and/or the Navier-Stokes equations, with regard to a motion of fluid by a computer.

As a practical method, deformation amounts of the structural object can be obtained as convergence values by a loop calculation which repeats calculation of the deformation amounts of the structural object according to a distribution of air pressure load, and calculation of the distribution of air pressure load according to the deformation amounts of the structural object. Note that, in many cases, it is not practical to repeatedly perform the CFD analysis itself, of which input is structure information of the structural object in which the deformations are reflected and which calculates the distribution of air pressure load, as a part of the optimization calculation. Accordingly, it is practical to perform CFD analyses in advance to make a database of a relation between deformation amounts of the structural object and distributions of air pressure load.

When the loop calculation is performed for taking the deformation of the structural object into consideration, the number of times of the loop calculation is set, in Step S2. The number of times of the loop calculation can be determined to be an empirical number of times by which it can be considered that the deformation amounts of the structural object can be calculated as convergence values in a sufficient accuracy. A user can set the number of times of the loop calculation, manually with the operation of the input circuit 5, as one of parameters which define conditions of the optimization calculation. Alternatively, an empirical value may be preset beforehand.

Next, in Step S3, the FEM structural analysis is performed. Thereby, a stress distribution, arising inside the structural object due to a distribution of air pressure load, and deformation amounts of the structural object are calculated. In the initial FEM analysis, the deformation amounts of the structural object before a pressure load distribution of air is applied are set into zero. Then, a stress distribution and deformation amounts of the structural object in a case that the pressure load distribution of air is an ideal distribution are calculated. Specifically, displacement amounts of nodes of each element in the FEM model and a stress applied to each element are calculated by the FEM structural analysis.

Next, in Step S4, it is determined whether the number of times of the loop calculation reaches the number of times which has been not in Step S2. When the number of times of the loop calculation has not reached the predetermined number of times, a distribution of air pressure load applied on the structural object after the deformation is obtained in Step S5. The distribution of air pressure load can be obtained by referring to the prepared results of CFD analyses, based on displacement amounts of the nodes of each element of the FEM model obtained as a result of the FEM analysis as mentioned above.

When the distribution of air pressure load according to the deformation amounts of the structural object has been obtained, the FEM structural analysis is performed again, in Step S3. Note that, the input data of the FEM analysis is the distribution of air pressure load, after the deformation of the structural object, obtained in Step 95. Therefore, displacement amounts of the nodes of each element in the FEM model corresponding to the distribution of air pressure load obtained in Step 05 and a stress applied to each element are calculated.

The above-mentioned loop calculation including the calculations of displacement amounts of the nodes of each element in the FEM model and a stress applied to each element, and obtaining a distribution of air pressure load corresponding to the displacement amounts is repeated the predetermined number of times set in Step S2. When the number of times of the loop calculation reaches the predetermined number of times set in Step S2, it is determined as YES in the determination of Step S4. Then, a stress distribution of the structural object is obtained, as a convergence solution, with considering deformation of the structural object due to the static aeroelastic effect.

Then, in Step S6, whether strengths of the structural object are within allowable ranges respectively is determined. Specifically, it is determined whether a stress applied to each element of the FEM model obtained by the FEM analysis is within an allowable range specified by an acceptable value derived by adding a strength margin to a buckling load or the like. Conversely, it is determined whether each strength of the structural object specified by the design parameters is enough to the stress distribution obtained by the FEM analysis.

In the strength evaluations of the structural object, a strength evaluation based on an allowable range or allowable ranges set by post buckling analysis of a composite material can be included. Specifically, when the strength evaluation of the spar 20 as shown in FIG. 7 is performed, a distribution of internal load Nxy of the spar web 21 corresponding to a height H and a sheet thickness t of the spar web 21 set as design parameters is calculated by the FEM structural analysis in Step S3.

Meanwhile, a sheet thickness $t_{min}$ of the spar web 21 whose height is H, necessary for a case that the internal load Nxy is applied on the spar web 21, can be obtained from an evaluation table showing a relation between sheet thicknesses $t_{min}$ and each of heights H and internal loads Nxy of the spar web 21, as shown in FIG. 6. Therefore, when the sheet thickness t of the spar web 21 set as a design parameter is thicker than the sheet thickness $t_{min}$ obtained from the evaluation table, necessary strengths after buckling is to be satisfied.

In addition, in case of the strength evaluation of the spar 20 as shown in FIG. 7, strength evaluations of the stiffeners 23 and the chords 22 are also performed. Specifically, it is evaluated whether each maximum principal strain and each load, which causes a crippling fracture, are not less than acceptable values or not respectively.

In determination of Step S6, when it has been determined that at least one strength of the structural object is not within an allowable range, a value of a certain design parameter is varied into a next value again, in Step S1.

Then, the strength evaluation of the structural object corresponding to the updated design parameters is performed again. Varying the design parameters includes not only varying design parameters for sizing structural members but also varying design parameters for specifying materials of structural members, design parameters expressing lamination structures of composite material and a design parameter expressing discernment information of an FEM model. Then, varying the design parameters and the calculation of stress distributions with considering deformation of the structural object are repeated until strengths of the structural object are determined to be not less than acceptable values respectively (stresses in respective elements of the FEM model are not more than acceptable values respectively).

When the strengths of the structural object have been determined to be within the allowable ranges respectively, a flutter speed analysis is performed for the FEM model which simulates the structural object, in Step S7. Thereby, flutter speeds in respective elements of the FEM model are calculated. As a method of calculating flutter speeds, an arbitrary known method can be adopted.

Next, in Step S8, it is determined whether the flutter speeds of the structural object are within an allowable range. Specifically, the determination of whether the flutter speeds of the respective elements of the FEM model, obtained by the flutter speed analysis, are within the allowable range is performed. When it has been determined that at least one of the flutter speeds of the respective elements of the FEM model is not within the allowable range, a value of a certain design parameter is varied again, in Step S1. Then, the strength evaluation and the flutter speed evaluation of the structural object are performed again.

Meanwhile, when it has been determined that all the flutter speeds of the respective elements of the FEM model are within the allowable range, weight of the structural object is calculated in Step S9. Specifically, the weight of the structural object specified by the combination of the design parameters is calculated.

Next, in Step S10, whether one more repetitive calculation is necessary in the optimization calculation is determined. For example, when the number of times of the repetitive calculation has been designated, the necessity of the additional repetitive calculation can be determined based on whether the number of times of the repetitive calculation reaches the designated number of times of the repetition or not. Alternatively, when an upper limit in weight of the structural object has been designated, the necessity of the additional repetitive calculation can be determined based on whether the weight of the structural object is within an allowable range specified by the upper limit or not.

When the number of times of the repetitive calculation has not reached the designated number of times of the repetition or when the weight of the structural object is not within the allowable range, a value of a certain design parameter is varied again, in Step S1. Then, the strength evaluation and the flutter speed evaluation of the structural object, and the calculation of weight of the structural object are performed again.

Meanwhile, when the number of times of the repetitive calculation has reached the designated number of times of the repetition or when the weight of the structural object has become within the allowable range, the optimal value in weight of the structural object and design parameters corresponding to the optimal value in weight of the structural object, which have been calculated as a result of the optimization calculation, are output to the display 6, in Step S11. The design parameter group, corresponding to the optimal value in weight of the structural object, output to the display 6 can be used as optimal design information of the structural object.

Figure 9:
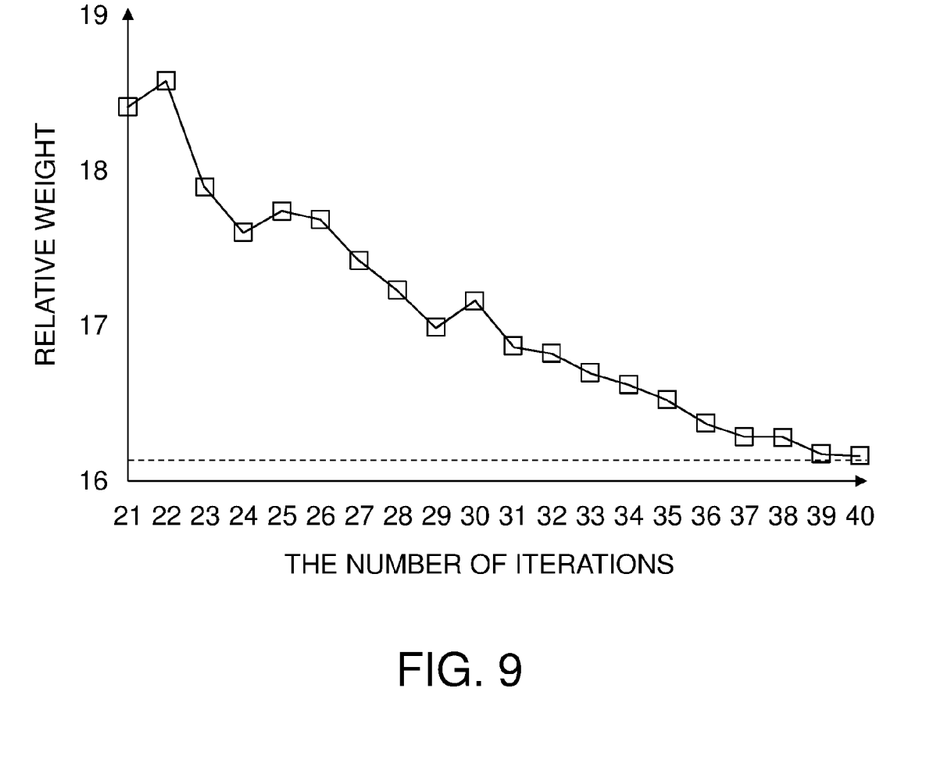
FIG. 9 is a graph which shows an example of a result of the optimization calculation by the designing system 1 of an aircraft structural object shown in FIG. 1.

FIG. 9 is a graph which shows an example of a result of the optimization calculation by the designing system 1 of an aircraft structural object shown in FIG. 1.

In FIG. 9, the vertical axis shows relative weight of a structural object, and the horizontal axis shows the number of repetitions of the optimization calculation. As shown in FIG. 9, the more the number of the repetitions of the optimization calculation increases, the smaller the relative weight of the structural object becomes. Therefore, the optimal value of weight of the structural object can be obtained by setting a sufficient number of the repetitions, or setting an upper limit to the weight of the structural object.

Furthermore, a combination of design parameters corresponding to the optimal value of weight of the structural object can be obtained as optimal design information of the aircraft structural object. Then, an aircraft structural object can be manufactured actually in accordance with the design information of the aircraft structural object created by the above mentioned method. An aircraft structural object manufactured by such a production method becomes a structural object whose weight has been optimized. Therefore, further weight saving of the whole aircraft as a finished product can be attained.

That is, the designing system 1 of an aircraft structural object as mentioned above enables to automatically obtain design information of a structural object composing an aircraft, corresponding to the minimum weight of the structural object, by covering constraints which should be evaluated in a detail design of the structural object.

EFFECTS

Therefore, according to the designing system 1 of an aircraft structural object, it becomes possible to perform a structural design so as to minimize weight of a structural object as far as possible at the time of a detail design of the structural object. Specifically, though optimization of weight of the whole aircraft has been performed conventionally when an outline specification of the whole aircraft is designed, optimization of weight of even a structural object which composes an aircraft can be also performed.

In addition, according to the designing system 1 of an aircraft structural object, conditions which should be considered are covered. Therefore, optimal design information of a structural object can be obtained by a single calculation. Specifically, strengths and flutter speeds of a structural object can be evaluated based on loads set in consideration of deformation of a wing and the like. Therefore, sizing of complicated and detailed structural members and calculation of weight of a structural object can be performed with a high accuracy.

Moreover, the designing system 1 of an aircraft structural object is adaptive to a post buckling design of composite material. Therefore, weight of a structural object can be reduced to the utmost limit.

Furthermore, though an FEM model has been created and an analysis has been performed after a structural pattern and a structural diagram of a structural object are settled conventionally, the designing system 1 of an aircraft structural object can variably set an FEM model itself. Specifically, a structural pattern, including the numbers of spars and ribs and arrangement thereof, which are important factors for minimizing weight of a structural object, can be defined as a design parameter. As the result, optimization of a structural pattern becomes possible and the minimum value of weight of a structural object can be calculated with a higher accuracy.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of optimizing weight in a design of an aircraft structural object based on a plurality of parameters, the method comprising:

receiving, by a computer, the plurality of parameters respectively having predetermined ranges for an optimization calculation which minimizes a weight of the structural object composing an aircraft, the plurality of parameters expressing the design information of the structural object;

receiving, by the computer, at least one allowable range for securing at least a strength of a composite material after buckling, the at least one allowable range being set as a constraint condition of the optimization calculation, the composite material composing the structural object corresponding to the plurality of parameters;

calculating, by the computer, an optimal value of the weight of the structural object and values of the plurality of parameters by the optimization calculation performed by varying the plurality of parameters in the respective predetermined ranges in a finite element method, the values of the plurality of parameters corresponding to the optimal value of the weight of the structural object and meeting the at least one allowable range; and displaying, by a display of the computer, the optimal value of the weight of the structural object and the plurality of parameters corresponding to the optimal value of the weight of the structural object, wherein the plurality of parameters include two or more parameters selected from the group consisting of a number of spars composing the structural object, a number of ribs composing the structural object, angles of the spars, angles of the ribs, and a parameter indicating whether the panel has a structure in which a honeycomb is sandwiched between two sub panels, and the method further comprises manufacturing the aircraft structural object based on the optimal value of the weight of the structural object as determined by the optimization calculation based on the plurality of parameters.

2. The method according to claim 1,
wherein the structural object has a structure in which the ribs and the spars are attached on the panel.

3. The method according to claim 1,
wherein the allowable range for securing the strength of the composite material after the buckling is obtained by a post-buckling analysis of the composite material performed previously to the optimization calculation.

4. The method according to claim 1,
wherein models, each used for an analysis by a finite element method, are made and information for identifying one of the models is set as one of the plurality of parameters expressing the design information, the models respectively corresponding to structural patterns which can be adopted as a structural pattern of the structural object, the analysis by the finite element method being performed in order to calculate at least the strength of the structural object.

5. The method according to claim 2,
wherein the allowable range for securing the strength of the composite material after the buckling is obtained by a post-buckling analysis of the composite material performed previously to the optimization calculation.

* * * * *